Dec. 20, 1960    G. DETTWILER    2,965,388
FLUID PRESSURE OPERATED TILTING DEVICE FOR AUTOMOBILES
Filed Sept. 14, 1959    2 Sheets-Sheet 1

INVENTOR
Georges DETTWILER
BY Pierre L'espérance
PATENT AGENT

Dec. 20, 1960 G. DETTWILER 2,965,388
FLUID PRESSURE OPERATED TILTING DEVICE FOR AUTOMOBILES
Filed Sept. 14, 1959 2 Sheets-Sheet 2

INVENTOR
Georges DETTWILER
BY Pierre Lespérance
PATENT AGENT

United States Patent Office 2,965,388
Patented Dec. 20, 1960

2,965,388

FLUID PRESSURE OPERATED TILTING DEVICE FOR AUTOMOBILES

Georges Dettwiler, 12405 Jasmin St., Cartierville, Montreal, Quebec, Canada

Filed Sept. 14, 1959, Ser. No. 839,797

Claims priority, application Canada Oct. 25, 1958

5 Claims. (Cl. 280—112)

The present invention relates to a tilting device for automobiles or other steerable vehicles such as railway wagons which will automatically bank or tilt the vehicle so as to overcome centrifugal force when making a turn, and especially to be used on winding roads.

The main object of the present invention is the provision of a device of the character described which has means operable in dependence upon the direction of turn of the vehicle to raise the side of the vehicle on the outside of the turn and positively lower the side of the vehicle on the inside of the turn, thus banking or laterally tilting the vehicle downwardly towards the inside of the turn to assist the passengers to overcome the centrifugal force and which provide means to resist side sway of the body of the vehicle in a direction opposite to the direction of turn; side sway normally occurs in a turn because centrifugal force tends to raise the body at the inner side of the curve and throw the weight of the vehicle and body toward the outside of the curve.

Yet another important object of the present invention is the provision of a device of the character described which incorporates valve means to render the same inoperative when the vehicle is driven on a straight highway or the like where no need for preventing side sway is really needed, thus this auxiliary valve means avoid undue wear and tear on the device of the present invention.

Still another important object of the present invention is the provision of a device of the character described, which acts as shock absorbers for the vehicle.

Yet another important object of the present invention is the provision of a device of the character described, which is so arranged that it can act as shock absorbers for the vehicle with adjustable resistance to shock to thereby provide a suspension which can be regulated to be more or less soft or flexible.

Yet another important object of the present invention is the provision of a novel rotary selector valve for controlling the system and which is in turn directly operated by the steering gear of the vehicle.

Still another important object of the present invention is the provision of a device of the character described which will tilt the vehicle laterally to an extent which will be substantially proportional to the steering angle of the steerable road wheels of the vehicle.

Yet another important object of the present invention is the provision of a device of the character described which allows quick return to a level position when the steerable road wheels are in straight position.

Another important object of the present invention is the provision of a device of the character described, which is simple and relatively inexpensive in construction and which can be adapted to different types of motor vehicles.

The foregoing and other important objects of the present invention will become more apparent during the following disclosure and by referring to the drawings in which.

Figure 1:
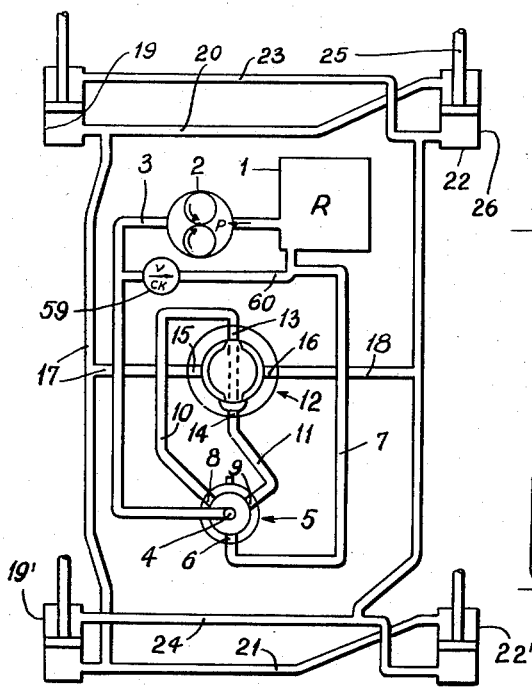
Figure 1 is a schematic plan view of the device in accordance with the present invention.

Referring more particularly to the drawings in which like reference characters indicate like elements throughout, the tilting or banking device of the present invention consists of a hydraulic system schematically illustrated in Figure 1. The system comprises a reservoir 1 open to atmosphere and connected to the intake of a gear pump 2 which is directly driven by the engine of the motor vehicle at a speed which is proportional to the speed of said engine and therefore said pump delivers a hydraulic pressure which is proportional to the engine speed for a predetermined range of speed. The output line 3 of the pressure pump 2 is connected to the center port 4 of a distributor valve 5 which has a bottom return port 6 connected to the return line 7 leading back to the reservoir 1, and two further lateral ports 8 and 9 respectively connected to the pressure line 10 and return line 11 of a selector valve 12. More particularly, said valve 12 has a top port 13 connected to pressure line 10 and a bottom port 14 connected to return line 11. Selector valve 12 further has two lateral ports 15 and 16 respectively connected to fluid lines 17 and 18; left hand side fluid line 17 is connected to the lower chambers of double acting hydraulic cylinder and piston units 19 and 19' at the left hand side of the vehicle and, through lines 20 and 21, to the upper chambers of the cylinders of the double acting cylinder and piston units 22 and 22' at the right hand side of the motor vehicle. Right hand side fluid line 18 is adapted to feed fluid under pressure to the lower chambers of units 22 and 22' and through fluid lines 23 and 24 to the upper chambers of the left hand side units 19 and 19'.

The units 19, 19', 22 and 22' are mounted at the four wheels of the motor vehicle between the chassis C and the back and rear wheels W. The particular way of mounting the units 19 to 22' inclusive will depend on the specific type of motor vehicle. One preferred way of mounting the same is the one illustrated in Figures 2 and 3 of U.S. Patent Number 2,490,719 issued December 6, 1949, said figures illustrating a front wheel mounting and a rear wheel mounting respectively. However, in accordance with the present invention, the shock absorbers as usually found in motor vehicles, are completely eliminated and only the regular coil springs for the front wheels and the leaf springs for the rear wheels are still used.

Figure 2:
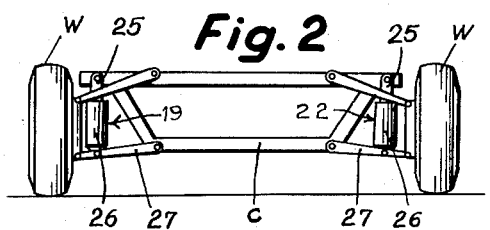
Figure 2 is a schematic elevation looking at the back of the front part of a vehicle chassis with front steerable road wheels and hydraulic lifting units of the device of the present invention, the chassis being shown in level position.
Figure 3:
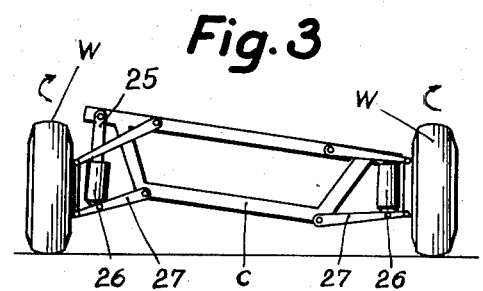
Figure 3 is a schematic elevation similar to that of Figure 2 but showing the chassis in laterally inclined position for a right hand turn.
Figure 4:
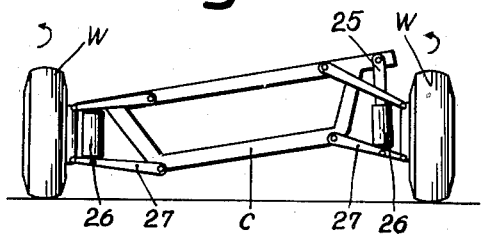
Figure 4 is a similar elevation for a left hand turn.

Figures 2 to 4 inclusive are schematic rear elevations of the front part of the vehicle chassis C showing how the front units 19 and 22 have their piston rod 25 pivotally connected to the chassis C and their cylinder 26 pivotally connected to the lower link 27 of the suspension system for the front steerable road wheels W. The suspension coil springs are not illustrated for clarity of the drawings, but will normally surround the cylinder 26 of the front units. Similarly, the rear units 19' and 22' will extend between the chassis C and the rear axle. The rear units will be pivotally connected to the chassis and rear axle or springs for freedom of movement longitudinally as well as laterally of the motor vehicle.

Each cylinder and piston unit 19, 19', 22 and 22' is double acting and will raise the chassis with respect to the wheels in the extension movement of the units and will lower said chassis with respect to the wheels against the action of the springs in the contraction movement of the units.

Figure 8:
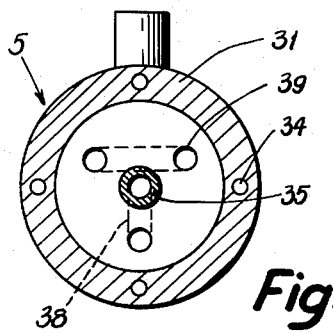
Figure 8 is a section along line 8—8 of Figure 7.

The distributor valve 5 illustrated in Figures 7 to 11 inclusive is mounted on the motor vehicle so that its control shaft 28 may be manually rotated directly by the driver of the motor vehicle. The distributor valve 5 is constituted by a housing 29 and a rotor 30 which is fixed to and rotated by control shaft 28. The housing 29 is made in two parts namely housing parts 31 and 32, which are rigidly secured together in fluid tight manner by bolts (not shown) passing through bores 33 and threadedly engaging bores 34. The housing part 31 has a cylindrical cavity which is accurately machined for receiving the rotor 30 also of cylindrical shape. The control shaft 28 extends through a central bore made in the housing part 31, said shaft extending outwardly from one flat face of the rotor. A nipple or hollow extension 35 is fast with the rotor 30 and extends in axial alinement with the control shaft 28 from the opposite flat face of the rotor 30. The nipple 35 is rotatably journaled in a bore made in housing part 32, such that the nipple 35 is in fluid communication with the center port 4 of the housing part 32. A spring pressed ball 36 is urged against the cylindrical surface of the rotor 30 and is adapted to resiliently maintain said rotor in three predetermined positions by engaging suitably angularly spaced notches 37 made at the surface of the rotor. The rotor 30 can take the three selected positions illustrated in Figures 8, 9 and 10 respectively. In the position of Figure 8, which is a neutral position, the nipple containing U-shape passageway 38 of the rotor establishes communication between center port 4 and bottom or return port 6 of the distributor valve so that fluid under pressure fed by pump 2 and line 3 to center port 4 returns directly to the reservoir 1 through bottom port 6 and return line 7. Also in the neutral position of the rotor 30 of the distributor valve 5, a second U-shape passageway 39 made in said rotor establishes communication between the two lateral taps 8 and 9. When the rotor is rotated through approximately 120° as indicated by a suitable arm and dial (not shown) on the dash board of the motor vehicle, the rotor takes its second position illustrated in Figure 9 in which the first U-shape passageway 38 establishes communication between center port 4 and left hand side lateral port 8 whereby fluid under pressure is fed from pump 2 through line 3, center port 4, lateral port 8 and line 10 to the top port 13 of the selector valve 12, while the return line 11 of said selector valve is connected to reservoir 1 through port 9, second passageway 39, bottom port 6 of the distributor valve, and line 7.

Figure 9:
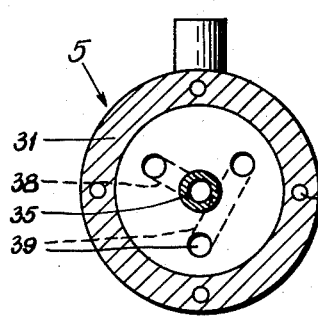
Figures 9 and 10 are sections similar to that of Figure 8, but showing the rotor in other positions.

The second position of the distributor valve illustrated in Figure 9 is the operative position for the system of the present invention.

Figure 10:
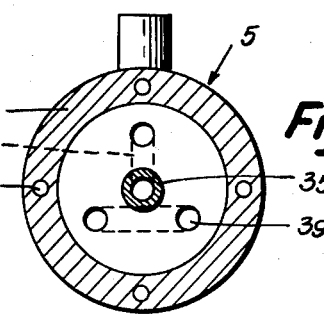
Figure 11:
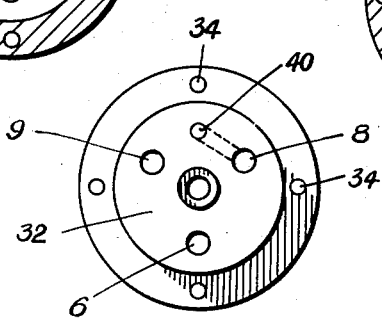
Figure 11 is a front elevation of the inside face of the right hand side part of the stator of the distributor valve as seen in Figure 7.

When the rotor 30 of the distributor valve is rotated through a further 60° angle to the position shown in Figure 10, return port 6 is completely blocked being no longer in register with any of the passageways 38 and 39. On the other hand, passageway 38 has its upper end opposite and in communication with an auxiliary bypass bore 40 made in the housing part 32 and communicating with port 8 connected to pressure line 10; thus in the third position of the distributor valve, fluid under pressure can still be fed to the selector valve through line 3, center port 4, passageway 38, bypass bore 40, port 8 and pressure line 10, but the return line 11 from the selector valve 12 is blocked by the distributor valve and cannot therefore be maintained in communication with reservoir 1; thus in the third position of the distributor valve, fluid under pressure can be fed to the units 19, 19', 22 and 22' while the return line from these units are blocked so that said units can be maintained at the full pressure derived from pump 2; thus the suspension of the vehicle is blocked or considerably stiffened by the units 19, 19', 22 and 22'. It will be understood that when the rotor 30 is rotated from the second operative position of Figure 9 to the third blocking position of Figure 10, the suspension will become progressively stiffer as the return line 7 is gradually cut off.

Figure 12:
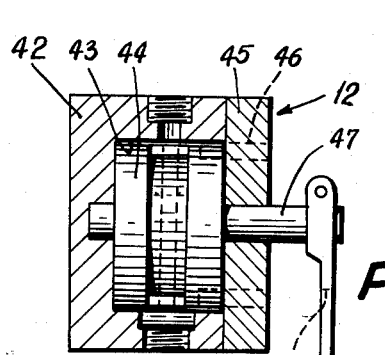
Figure 12 is a longitudinal central section of the selector valve.
Figure 6:
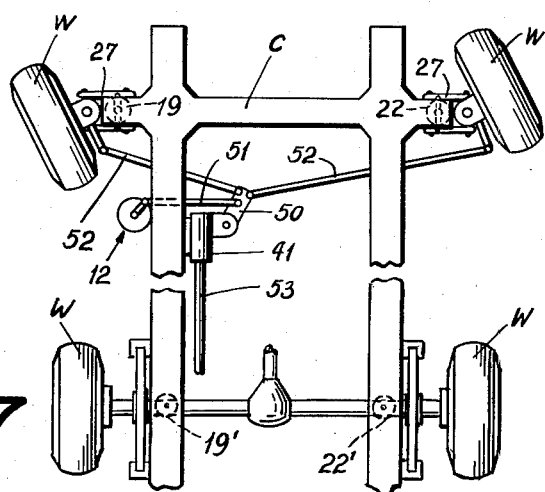
Figure 6 is a schematic plan view similar to Figure 5 for a left hand turn and corresponding to Figure 4, said view also showing the rear wheels.
Figure 5:
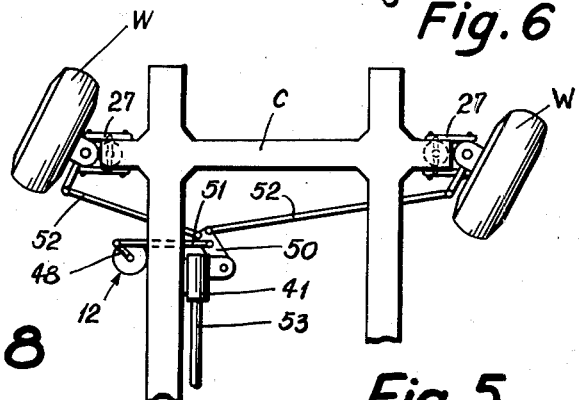
Figure 5 is a schematic plan view of the vehicle chassis and front steerable wheels for a right hand turn and corresponding to Figure 3.

The selector valve 12 is mounted on the chassis C adjacent the vehicle steering gear schematically illustrated at 41 in Figures 5 and 6. As shown in Figure 12, the selector valve 12 comprises a stator or housing 42 having a cylindrical cavity 43 in which is slidably fitted a cylindrical rotor 44; the housing 42 is closed by a flat cover 45 which is bolted to said housing by bolts engaging bolt holes 46. The rotor 44 is provided with a control shaft 47 which is rotated by arm 48 rigidly secured thereto and having an elongated slot 49 for adjustable connection by link 51 with the usual pitman arm 50 of the conventional steering gear 41 of the motor vehicle. As shown in Figures 5 and 6, the pitman arm 50 is pivotally connected to the front steerable wheels of the motor vehicle through the steering rods 52 of any usual conventional construction, thus rotation of the steering wheels of the motor vehicle through the steering post 53 will cause simultaneous rotation of the rotor 44 of the selector valve 12 through an angle which will be proportional to the angle made by the front steerable wheels and which is adjustable in accordance with the connection point of the link 51 within the slot 49 of the arm 48.

Figure 13:
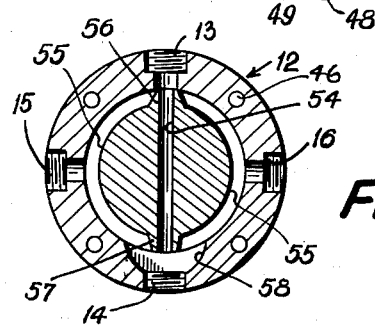
Figure 13 is a cross-section of the selector valve of Figure 12 shown in neutral position.

The housing 42 is provided with four holes or ports disposed at right angles with each other and radially extending through the thickness of the housing to open within the cavity 43 and at the exterior of the housing. These holes were already referred to hereinabove as top port 13, bottom port 14 and lateral ports 15 and 16, reference being had to Figure 1. As shown in Figures 12 and 13, the rotor 44 is provided with a central diametrically extending through bore 54 which makes communication between top and bottom ports 13 and 14 in the normal position of the rotor that is, in its position corresponding to the straight position of the front steerable wheels of the motor vehicle. The rotor 44 is provided with a pair of symmetrically disposed peripheral grooves 55 arranged in the general plane of the through bore 54 but terminating short of the ends of said through bore so as to leave portions 56 and 57 immediately surrounding the ends of the through bore, having the full diameter of the rotor and adapted to be in fluid sealing contact with the inner surface of the cavity 43 of housing 42. The bottom port 14 of the housing communicates with an enlarged recess 58 made at the inner surface of the cavity 43 and having a substantial angular extent symmetrically on both sides of the rotor portion 57 when the rotor is in neutral position as shown in Figure 13; thus in said neutral position, fluid under pressure fed to top port 13 can circulate through bore 54 into recess 58 and then through bottom port 14 and return line 11 to reservoir 1 but many also circulate from cavity or recess 58 through grooves 55 into lateral ports 15 and 16 which communicate with the cylinder and piston units 19, 19', 22 and 22'.

Depending on whether the rotor is rotated clockwise or anti-clockwise, the top port 13 is made to communicate with left lateral tap 15 or right lateral port 16 while the other lateral port will be made to communicate with the bottom port 14 as clearly shown in Figure 14. In either one of these positions, the portions 56 and 57 of the rotor effect a good seal between the two halves of the valve.

Figure 14:
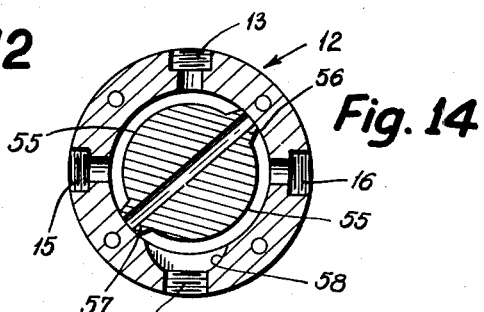
Figure 14 is a view similar to that of Fig. 13, but showing the rotor of the selector valve rotated for banking the motor vehicle in a right hand turn.
Figure 7:
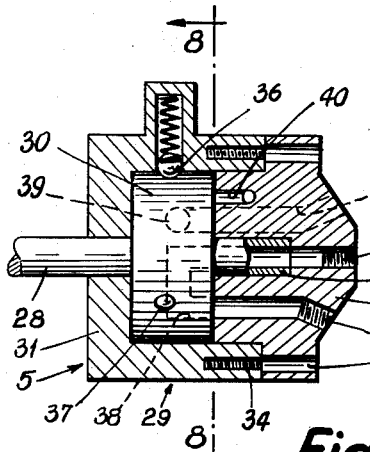
Figure 7 is a longitudinal central section of the distributor valve.

The position as shown in Figure 14 corresponds to a full rotational movement of the valve rotor which will normally correspond to a full steering movement of the front wheels of the motor vehicle. However, the rotor can take intermediate positions between those shown in Figures 13 and 14. Starting from Figure 13 it will be seen that clockwise rotational movement of the rotor will cause gradual uncovering of top port 13 and gradual restriction of the communication between left hand groove 55 and recess or cavity 58 by bottom rotor portion 57. The angular extent of recess 58 is preferably so calculated that when top port 13 is just in full communication with a selected groove 55 the sectional area of the communication between said groove 55 and cavity 58 is about half the full cross-sectional area of the top port 13 or through bore 54. Thus it will be appreciated that the recess 58 provides for a leak of the fluid under pressure which prevents full fluid pressure from reaching the cylinder and piston units 19, 19' or 22 and 22' immediately upon rotational movement of the rotor of selector valve 12; full fluid pressure will only be reached when the bottom portion 57 of the rotor will be in sealing contact with the inner surface of the cavity 43 of housing 42.

The system in accordance with the present invention is preferably completed by the provision of a safety check valve 59 illustrated in Figure 1 which prevents excess hydraulic pressure from developing within the circuit, said safety check valve allowing immediate return of the fluid under pressure from the pressure side of the pump 2 directly into the reservoir 1 through bypass line 60; the safety check valve 59 is set to open above a predetermined maximum operating pressure.

The system of the present invention operates as follows:

For normal highway driving when the vehicle will not be subjected to abrupt turning movements, the system in accordance with the present invention is rendered inactive in order to avoid wear and tear on the pressure pump and undue expense of energy. In order to render the system inactive, the rotor of the distributor valve 5 is rotated into neutral position (Figure 8) whereby oil fed from pump 2 is directly returned to the reservoir 1 through line 7. Whenever the driver of the motor vehicle encounters a winding road, he just turns the distributor valve to its second position (Figure 9) whereby the selector will automatically bank the vehicle towards the inside of a turn made by the vehicle. It will be noted that the extent of banking is substantially proportional to the degree of turn of the steering wheels which in turn rotate the rotor of the selector valve 12 to a proportionate angle. Also the angle and speed at which the car will be banked depends on the pressure output of the pump which in turn is dependent on the engine speed of the motor vehicle. Therefore the speed and degree of tilting will depend on the speed of the motor vehicle and on the sharpness of the curves.

The angle of tilting will be relatively pronounced since the units 19, 19', 22 and 22' are double acting units and act in opposite direction, one side raising the car and the other side positively lowering the chassis against the action of the suspension springs.

In the active or second position of the distributor valve 5, and when the selector valve 12 is in straight position, that is corresponding to the straight position of the front wheels of the vehicle, and in all positions of the selector valve 12 when distributor valve 5 is in neutral or first position, the pressure fluid can freely circulate between the two chambers of each of the lifting devices 19, 19', 22 and 22' whereby the latter act as shock absorbers and can totally replace the conventional shock absorbers of the motor vehicle.

On the other hand, when the distributor valve is in its third position, the return line connected to port 14 of the selector valve is completely blocked off at the distributor valve and therefore the pistons within the lifting units cannot move because the hydraulic fluid cannot circulate freely in the system and therefore the suspension for the motor vehicle is completely blocked and is very stiff. On the other hand, any intermediate position of the distributor valve between positions 2 and 3 will result in a variable degree of stiffness of the suspension.

While a preferred embodiment of the present invention has been illustrated and described, it is understood that various modifications may be made without departing from the spirit and scope of the appended claims.

What I claim is:

1. In a steerable vehicle chassis having front road wheels and rear road wheels, a system to tilt or bank the chassis laterally with respect to the wheels and road surface in a direction to counteract the centrifugal force produced when the vehicle is travelling in a curved path, said system comprising double acting lift devices disposed between the chassis and each of said wheels to positively raise one side of the vehicle and positively lower the other side, a source of fluid under pressure, first and second valve means and fluid circuit means for controlling the supply and return of said fluid to and from said lift devices, said first valve means controlling the supply of fluid under pressure at opposite sides of the automobile and operable upon steering of the vehicle in making a turn and such that the lateral inclination of the chassis with respect to the road wheels increases with increasing steering angle, said first valve means providing for leakage of fluid under pressure back into the return path of the circuit means for positions of said first valve means corresponding to a straight position of the steerable wheels of said vehicle, said leak gradually decreasing with increasing steering angle of the road wheels to thereby provide for increase of pressure admitted to the lift devices, said second valve means being manually operable to take at least two positions, namely a first position rendering said first valve means inoperative and a second position rendering said first valve means operative, said first valve means including a housing, and a cylindrical rotor disposed within said housing and rotatable about its main axis, said housing having a first pair of axially alined ports made therein for the admission and discharge of fluid under pressure, said rotor having a through bore made therein adapted to register with said first pair of ports in a neutral position of said rotor, said rotor having a pair of symmetrical peripheral grooves disposed on each side of said through bore and in the same plane and terminating short of the ends of said through bore, said housing further having a second pair of ports adapted to register with said grooves in said rotor respectively, said second pair of ports being connected to said lift devices.

2. In a steerable vehicle chassis as claimed in claim 1, said fluid circuit means connecting said first valve means and said lift devices and connecting said first and second valve means in such a manner that when said second valve means is in inactive position both sides of each of said double acting lift devices are interconnected through said first and second valve means and through said circuit means to permit free flow of fluid whereby said lift devices act as shock absorber for the automobile.

3. In a steerable vehicle chassis as claimed in claim 1, wherein said second valve means are operable to take a position blocking the return of pressure fluid from said lift devices to thereby stiffen the suspension of the chassis provided by said devices.

4. In a steerable vehicle chassis as claimed in claim 1, wherein the parts of said rotor immediately surrounding the ends of said through bore are in sealing contact with the inner surface of said housing.

5. In a steerable vehicle chassis as claimed in claim 4, wherein the discharge port of said housing forms a recess in the inner surface of the cavity for housing said rotor, said recess establishing communication between said grooves, said through bore and said discharge port in the neutral position of said rotor.

References Cited in the file of this patent

UNITED STATES PATENTS

| | | |
|---|---|---|
| 2,735,691 | Carlson | Feb. 21, 1956 |
| 2,804,311 | Pobanz | Aug. 27, 1957 |